United States Patent [19]

Takahashi et al.

[11] Patent Number: 5,294,781
[45] Date of Patent: Mar. 15, 1994

[54] MOVING COURSE DATA COLLECTION SYSTEM

[75] Inventors: Mitsuo Takahashi, Odawara; Ichiro Shimizu, Hiratsuka; Takashi Shima, Hadano, all of Japan

[73] Assignee: NCR Corporation, Dayton, Ohio

[21] Appl. No.: 889,228

[22] Filed: May 27, 1992

[30] Foreign Application Priority Data

Jun. 21, 1991 [JP] Japan .................. 3-175871

[51] Int. Cl.⁵ .......................... G06F 15/20
[52] U.S. Cl. .................. 235/376; 364/402; 235/383
[58] Field of Search ............ 235/379, 376, 383; 364/402, 403

[56] References Cited

U.S. PATENT DOCUMENTS

| | | | |
|---|---|---|---|
| 3,836,755 | 9/1974 | Ehrat | 235/383 |
| 4,099,591 | 7/1978 | Carr | 250/568 |
| 4,373,133 | 2/1983 | Clyne et al. | 235/383 |
| 4,812,629 | 3/1989 | O'Neil et al. | 235/383 |
| 5,111,196 | 5/1992 | Hunt | 235/383 |
| 5,166,499 | 11/1992 | Holland et al. | 235/376 |

FOREIGN PATENT DOCUMENTS 61-82287  4/1986  Japan .
3-226887  10/1991  Japan .................. 235/462

*Primary Examiner*—John Shepperd
*Assistant Examiner*—Jeffrey R. Filipek
*Attorney, Agent, or Firm*—Craig E. Miller

[57] ABSTRACT

A moving course data collection system for use in a large-scale store such as a supermarket or the like in which a portable scanner is provided to customers which allows customers to input article code data for articles in the store customers wish to purchase. The display location of all articles in the store is stored. Thus, every time a customer inputs article code data, the time and an approximation of the customer's position in the store is determined from the article code data input by the customer and the display location of that article in the store. This information is sequentially recorded, thereby collecting data on the customer's moving course through the store.

31 Claims, 3 Drawing Sheets

5,294,781

MOVING COURSE DATA COLLECTION SYSTEM

BACKGROUND AND SUMMARY OF THE INVENTION

The present invention relates generally to new and novel data collection systems. More particularly, the present invention relates to data collection systems which track the movement of customers when shopping in large scale stores such as supermarkets and the like.

The display of articles and how to position the passages in a store are quite important from the viewpoints of business tactics such as the influence thereof on the sales of individual merchandise articles, the relief of congestion, the elevation of the image of the store, the effective utilization of floor space and the like.

Furthermore, it is desirable to review whether articles are properly displayed and whether the passages are properly positioned from the above mentioned viewpoints to alter or improve the above as the case may be.

In order to review the articles and passages as mentioned above, it is desirable to track the moving course of customers and the state of congestion occurring in the store.

One known prior art arrangement for tracking the moving course of customers while shopping is described in Japanese Laid Open Patent Specification No. 82287/86. In this prior art arrangement, a transmitting device is attached to something the customer carries while shopping and receivers are installed for receiving a signal output from the transmitting device when the transmitting device comes within a predetermined distance of the receivers in an institution or store. This allows the moving course of customers to be calculated from the signal receiving state of the receivers.

However, this prior art arrangement has the drawback that the transmitting device which transmits the data on the moving course of customers is attached to something customers are carrying and the receivers which receive the data are installed at various locations in the store, which is costly.

Accordingly, an object of the present invention is the provision of a moving course data collection system which is capable of collecting data on the moving course of customers within a store.

Another object of the present invention is to provide a moving course data collection system which is capable of tracking the amount of time customers spend moving between various locations in a store.

These and other objects of the present invention are attained by the provision of a moving course data collection system whereby a portable scanner is provided to customers which allows customers to input article code data for articles in the store customers wish to purchase. The display location of all articles in the store is stored. Thus, every time a customer inputs article code data, an approximation of the customer's position in the store is determined from the article code data input by the customer and the display location of that article in the store. This information is sequentially recorded, thereby collecting data on the customer's moving course through the store.

Other objects, advantages and novel features of the present invention will become apparent in the following detailed description of the invention when considered in conjunction with the accompanying drawings.

DETAILED DESCRIPTION OF THE PREFERRED EMBODIMENTS

Figure 1:
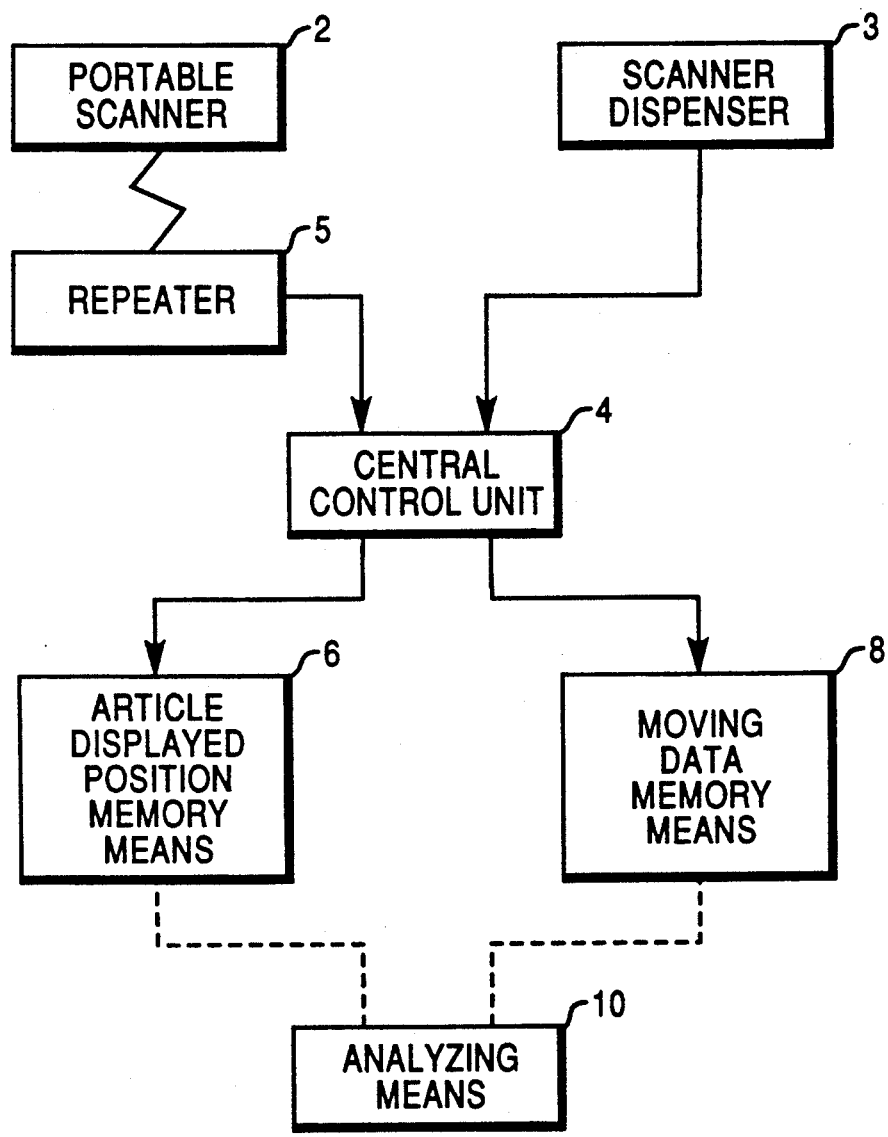
FIG. 1 is a block diagram of a preferred embodiment of a moving course data collection system according to the present invention.

Referring now to the drawings, in which like-referenced characters indicate corresponding elements throughout the several views, attention is first directed to FIG. 1 which is a block diagram of a moving course data collection system in accordance with the present invention. In this drawing, the reference numeral 2 denotes a portable bar code reading scanner which is provided to customers preferably upon entry into a store. When not in use, a plurality of scanners 2 are stored in scanner dispenser 3. Preferably, scanner dispenser 3 is located near the entrance to the store so customers can take scanner 2 from scanner dispenser 3 as customers enter the store. As customers select articles which they wish to purchase, they scan the article code or bar code using scanner 2.

When an article code is read by scanner 2, the article code, as well as a scanner number assigned to each scanner, is transmitted to data repeater 5. Such transmission is preferably by wireless means, for example radio waves. This information is then transmitted from data repeater 5 to central control unit 4. Central control unit 4 can be installed in a point of sale controller, a branch controller or in a central control computer. Thus, the movement of customers within the store, and the storage of input time and the like, can be monitored at a convenient central location. Article displayed position memory means 6 records the display locations for individual article codes within the store. Since the display locations are used to monitor the moving course of customers in the store, there is generally no need to identify the display locations in detail, but rather an approximation of an article's display location is input by dividing the store into position blocks of predetermined size as shown in FIG. 2.

Moving data memory means 8 records the article display location and data input time for individual scanners 2 as customers proceed through the store. This moving data is then processed and analyzed by analyzing means 10 to provide the desired output.

Figure 2:
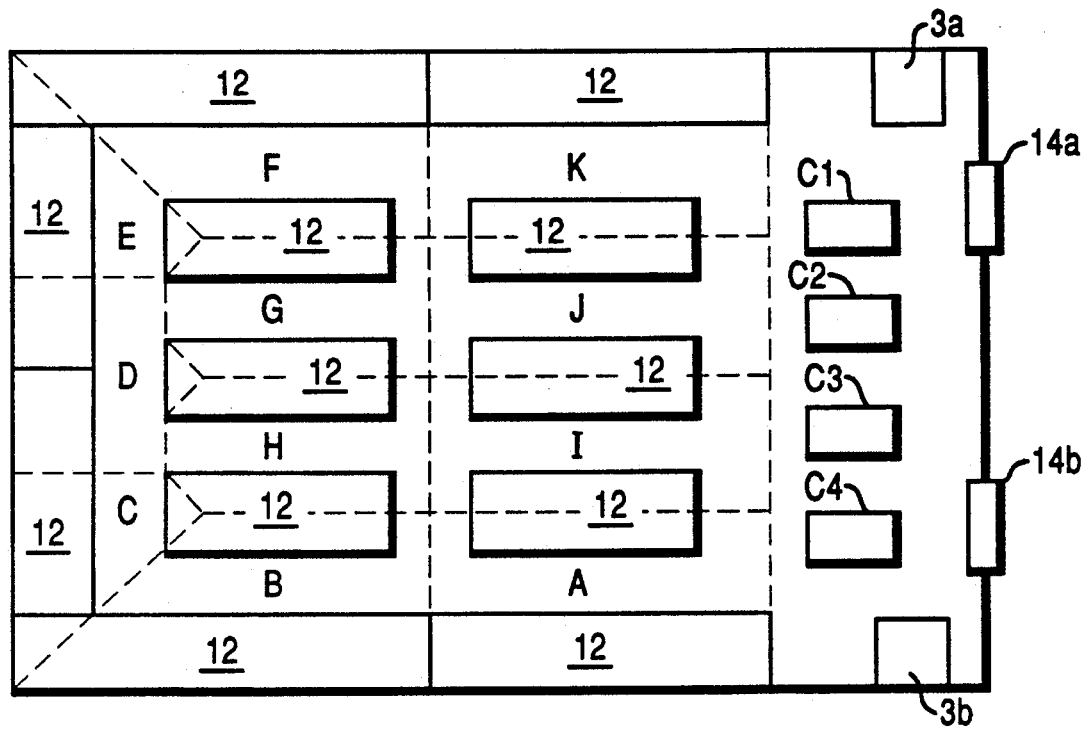
FIG. 2 is a representative layout of merchandise display cases and passages in a typical store and a possible arrangement of position blocks for tracking the moving course of customers in the store.
Figure 3:
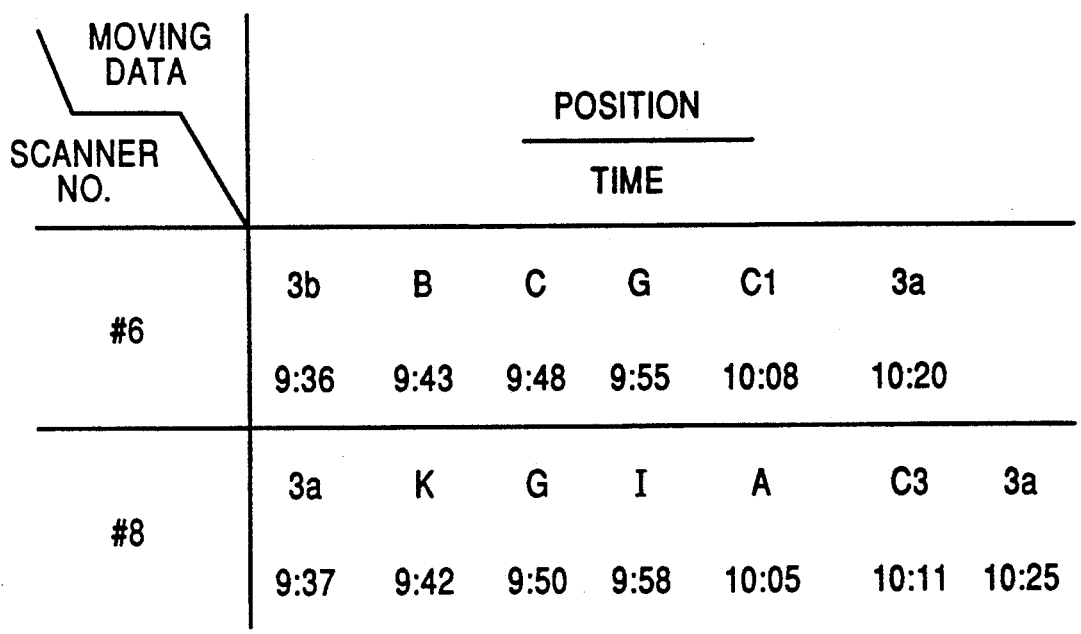
FIG. 3 is an example of a moving course data table where the moving course of customers in the store has been recorded.

FIG. 2 is a representation of a typical store layout showing an arrangement of merchandise article display cases 12, passages therebetween, and the like in the store. In this drawing, the letters A through K represent position blocks, bordered by light dashed lines, of predetermined size. An approximation of the display location of all merchandise in the store is stored in article displayed position memory means 6 by inputting the respective display block A through K where such merchandise is displayed. For example, all merchandise displayed on merchandise article display cases 12 within position block A is assigned display position A in displayed position memory means 6. Thus, position blocks A through K provide an approximation of the display location of merchandise displayed on that portion of merchandise article display cases 12 within respective position blocks A through K. FIG. 3 shows a representative moving data memory table as stored in moving data memory means 8.

Figure 4:
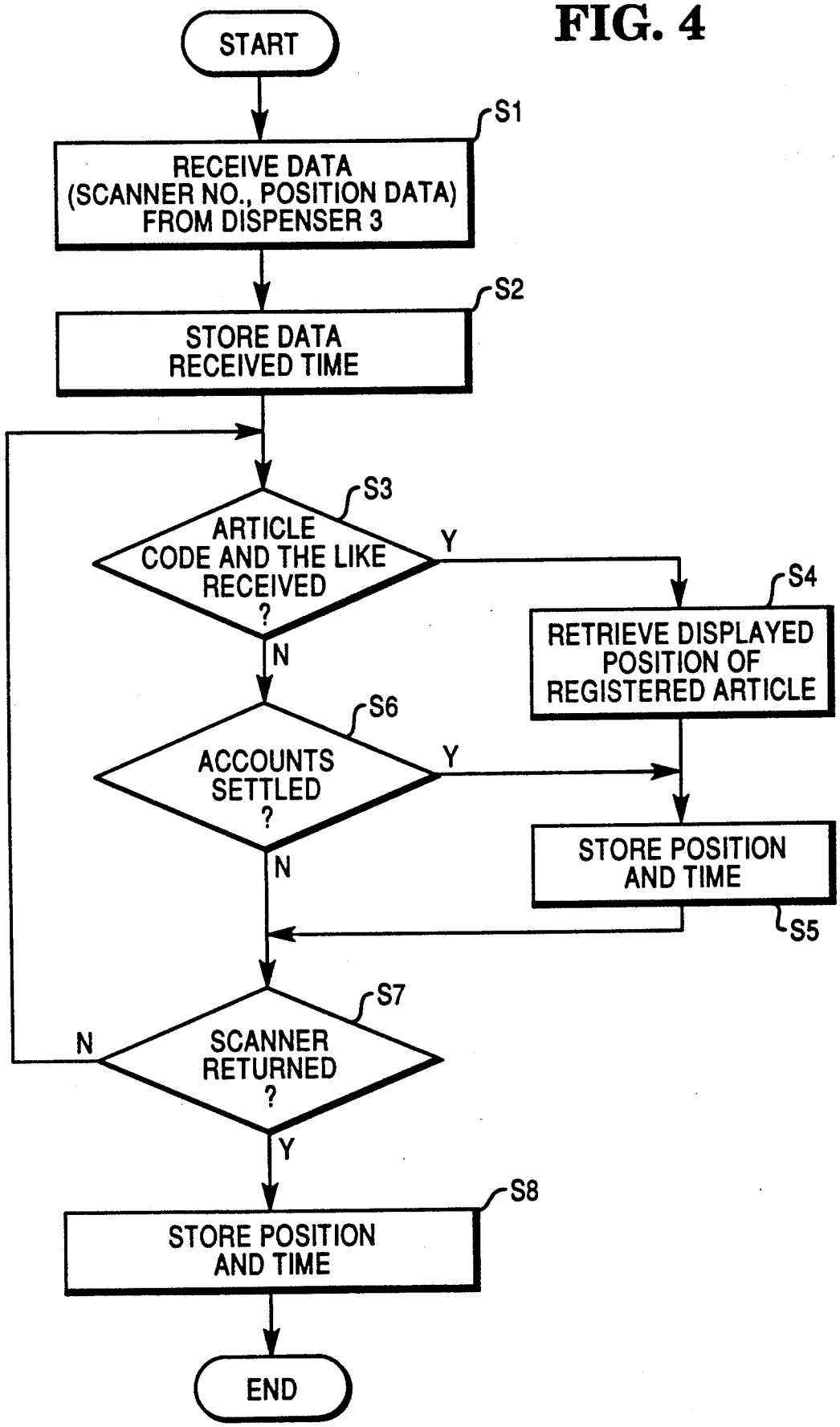
FIG. 4 is a flow chart which illustrates a procedure for collecting customers' moving course data in accordance with the present invention.

Referring now to FIG. 4, which is a flow chart representation of a procedure of collecting moving course data in accordance with the present invention, the data collecting procedure will now be illustrated. As customers enter into the store through entrance 14a or 14b they remove scanner 2 from scanner dispenser 3a or 3b. When scanner 2 is removed from scanner dispenser 3a or 3b, the scanner number assigned to that specific scanner is transmitted to central control unit 4 (S1). The scanner number and time is then stored in moving data memory means 8 (S2). For example, if scanner 2 selected by a customer has been assigned scanner no. 6, and scanner 2 is removed from scanner dispenser 3b at 9:36, this scanner number and time is recorded in moving data memory means 8 as shown in the first column of the first row of the moving data table shown in FIG. 3.

Central control unit 4 is continuously checking to determine if the scanning of an article code by a customer has been received (S3). If such data has been received, an approximation of the current position of the customer in the store is determined from the display location of that particular article in the store previously entered into article displayed position memory means 6 (S4). The article code scanned, the display location of that article in the store, and the input time are then recorded in moving data memory means 8 (S5). For example, if the article code of an article displayed in position block B is scanned by a customer at 9:43, the data is recorded as shown in column 2 of the top row of the moving course data table shown in FIG. 3. Central control unit 4 then determines if scanner no. 6 has been returned to scanner dispenser 3a or 3b (S7). If scanner no. 6 has not been returned, central control unit 4 returns to step (S3) and steps (S3), (S4), (S5) and (S7) are repeated for each scanning operation.

If no article code data is received by central control unit 4, central control unit 4 proceeds from step (S3) to step (S6) to determine if the customer's accounts have been settled. If the customer's accounts have been settled, an account settling processing signal is sent to central control unit 4 from a settlement counter. Accordingly, it can be determined if a customer's accounts have been settled by the presence or absence of an account settling processing signal. If the customer's accounts have not been settled, central control unit 4 proceeds to step (S7) to determine if scanner no. 6 has been returned to scanner dispenser 3a or 3b. If scanner no. 6 has not been returned, central control unit 4 returns to step (S3).

On the other hand, if the customer's accounts have been settled, central control unit 4 proceeds to step (S5) to record the time and store position where the customer's accounts were settled. Once this information is recorded, central control unit 4 proceeds to step (S7) to determine if scanner no. 6 has been returned to scanner dispenser 3a or 3b. If scanner no. 6 has not been returned, central control unit 4 returns to step (S3).

If scanner no. 6 has been returned to scanner dispenser no. 3a or 3b, central control unit 4 proceeds to step (S8) where the time and store position where scanner no. 6 was returned is recorded and the customer's moving course data table is complete.

As an example, the top row of the moving course data table shown in FIG. 3 shows the moving course of a customer who removed scanner no. 6 from scanner dispenser 3b at 9:36, scanned the article code of merchandise displayed in position block B at 9:43, scanned the article code of merchandise displayed in position block C at 9:48, scanned the article code of merchandise displayed in position block G at 9:55, settled the customer's accounts at cashier C1 at 10:08, and then returned scanner no. 6 to scanner dispenser 3a at 10:20. Similarly, the second row of the moving course data table shown in FIG. 3 shows the moving course of a customer who removed scanner no. 8 from scanner dispenser no. 3a at 9:37, scanned the article code of merchandise displayed in position block K at 9:42, scanned the article code of merchandise displayed in position block G at 9:50, scanned the article code of merchandise displayed in position block I at 9:58, scanned the article code of merchandise displayed in position block A at 10:05, settled the customer's accounts at cashier C3 at 10:11, and then returned scanner no. 8 to scanner dispenser no. 3a at 10:25.

While in the above embodiment, data collection is initiated when scanner 2 is removed from scanner dispenser 3, and data collection ends when scanner 2 is returned to scanner dispenser 3, as possible alternatives, data collection could be initiated when the first article code is scanned by a customer, or data collection could end when the customer's accounts are settled.

In addition, instead of instantaneous transmission of data from scanner 2 to repeater 5, the article code and time data could be temporarily stored in scanner 2 and this data transmitted to central control unit 4 when the customers' accounts are settled, or when scanner 2 is connected to an in-store data communication terminal. In this case, central control unit 4 would perform the steps shown in FIG. 4 on a plurality of article codes and input times in the order the article codes were scanned into scanner 2 by customers. This information can then be used to prepare a moving course data table as shown in FIG. 3.

Although the present invention has been described above in detail, the same is by way of illustration and example only and is not to be taken as a limitation on the present invention. The scope and content of the present invention are defined only by the terms of the appended claims.

What is claimed:

1. A moving course data collection system for tracking the movement of customers through a store, comprising:
   a portable scanner adapted to read and transmit article code data;
   a central control unit adapted to receive said article code data transmitted by said portable scanner;
   said portable scanner being provided to said customers such that said customers input said article code data for articles purchased by said customers into said portable scanner; and
   said central control unit includes processing means for storing the display location of said articles in said store such that said article code data of said articles purchased by said customers and transmitted by said portable scanner to said central control unit corresponds to an approximation of the position of said customers in said store, said processing means sequentially recording said article code data in the order in which said article code data is read by said portable scanner, thus collecting moving course data for said customers.

2. The moving course data collection system in accordance with claim 1, wherein said portable scanner is provided to said customers upon entry into said store and said customers scan said articles they wish to purchase as said customers proceed through said store.

3. The moving course data collection system in accordance with claim 1, wherein said processing means provides a moving course data chart which sequentially tracks said position of said customers in said store and article code data input times to provide a summary of the moving course of said customers through said store.

4. The moving course data collection system in accordance with claim 1, wherein a plurality of said portable scanners transmit said article code data to said central control unit and each of said plurality of portable scanners are assigned an identification number which allows said article code data to be independently recorded for each of said plurality of portable scanners.

5. The moving course data collection system in accordance with claim 4, wherein said plurality of portable scanners are stored in a scanner dispenser when said portable scanners are not in use.

6. The moving course data collection system in accordance with claim 5, wherein said scanner dispenser is located near an entrance to said store and said customers remove said portable scanner from said scanner dispenser when entering into said store and return said portable dispenser to said scanner dispenser when leaving said store.

7. A method of tracking the movement of customers through a store, comprising the sequential steps of:
storing the display location of articles in said store;
providing said customers with a portable scanner adapted to read and transmit article code data;
reading said article code data of said articles customers wish to purchase with said portable scanner;
transmitting said article code data from said portable scanner to a central control unit; and
tracking the course of movement of said customers in said store by sequentially recording said article code data and said display location of said articles in said store.

8. The method of tracking the movement of customers through a store in accordance with claim 7, wherein said portable scanner transmits said article code data and time of input to said central control unit and said central control unit tracks the course of movement of said customers in said store by sequentially recording said article code data, said display location of said articles in said store and said time of input.

9. The method of tracking the movement of customers through a store in accordance with claim 8, further including a step of providing a moving course data chart which sequentially tracks said position of said customers in said store and said time of input to provide a summary of the moving course of said customers through said store following said step of tracking the course of movement of said customers in said store by sequentially recording said article code data, said display location of said articles in said store and said time of input.

10. The method of tracking the movement of customers through a store in accordance with claim 71 wherein said portable scanner is provided to said customers upon entry into said store and said customers scan said articles they wish to purchase as said customers proceed through said store.

11. The method of tracking the movement of customers through a store in accordance with claim 7, wherein said portable scanner transmits said article code data to said central control unit via wireless transmission.

12. The method of tracking the movement of customers through a store in accordance with claim 7, wherein a plurality of portable scanners transmit said article code data to said central control unit and each of said plurality of portable scanners are assigned an identification number which allows said article code data to be independently recorded for each of said plurality of portable scanners.

13. The method of tracking the movement of customers through a store in accordance with claim 12, wherein said plurality of portable scanners are stored in a scanner dispenser when said portable scanners are not in use.

14. The method of tracking the movement of customers through a store in accordance with claim 13, wherein said scanner dispenser is located near an entrance to said store and said customers remove said portable scanner from said scanner dispenser when entering into said store and return said portable dispenser to said scanner dispenser when leaving said store.

15. The method of tracking the movement of customers through a store in accordance with claim 14, wherein the collection of data is initiated upon removal of said portable scanner from said scanner dispenser.

16. The method of tracking the movement of customers through a store in accordance with claim 14, wherein the collection of data is initiated when the first article code data is transmitted from said portable scanner to said central control unit.

17. The method of tracking the movement of customers through a store in accordance with claim 14, wherein the collection of data is ended when said portable scanner is returned to said scanner dispenser.

18. The method of tracking the movement of customers through a store in accordance with claim 14, further including a step of settling customers' accounts for articles purchased by said customers following said step of tracking the course of movement of said customers in said store by sequentially recording said article code data, said display location of said articles in said store and said time of input, said step of settling customers' accounts transmits current status of said customers' accounts to said central control unit.

19. The method of tracking the movement of customers through a store in accordance with claim 18, wherein the collection of data is ended upon settlement of said customers' accounts.

20. An arrangement for tracking the movement of customers through a store, comprising:
a portable scanner adapted to read and transmit article code data, said portable scanner being provided to said customers such that said customers input said article code data for articles purchased by said customers into said portable scanner;
a central control unit which receives said article code data from said portable scanner;
an article displayed memory means which stores the display location of said articles in said store;

a moving data memory means which stores said article code data transmitted from said portable scanner and said display location of said articles in said store to determine an approximation of the position of said customers in said store;

an analyzing means for sequentially recording said position of said customers in said store to track the movement of said customers through said store.

21. The arrangement for tracking the movement of customers through a store in accordance with claim 20, wherein said portable scanner is provided to said customers upon entry into said store and said customers scan said articles they wish to purchase as said customers proceed through said store.

22. The arrangement for tracking the movement of customers through a store in accordance with claim 20, wherein said analyzing means provides a moving course data chart which sequentially tracks said position of said customers in said store and article code data input times to provide a summary of the moving course of said customers through said store.

23. The arrangement for tracking the movement of customers through a store in accordance with claim 20, wherein said portable scanner transmits said article code data to said central control unit via wireless transmission.

24. The arrangement for tracking the movement of customers through a store in accordance with claim 20, wherein a plurality of portable scanners transmit said article code data to said central control unit and each of said plurality of portable scanners are assigned an identification number which allows said article code data to be independently recorded for each of said plurality of portable scanners.

25. The arrangement for tracking the movement of customers through a store in accordance with claim 24, wherein said plurality of portable scanners are stored in a scanner dispenser when said portable scanners are not in use.

26. The arrangement for tracking the movement of customers through a store in accordance with claim 25, wherein said scanner dispenser is located near an entrance to said store and said customers remove said portable scanner from said scanner dispenser when entering into said store and return said portable dispenser to said scanner dispenser when leaving said store.

27. The arrangement for tracking the movement of customers through a store in accordance with claim 26, wherein the collection of data is initiated upon removal of said portable scanner from said scanner dispenser.

28. The arrangement for tracking the movement of customers through a store in accordance with claim 26, wherein the collection of data is initiated when the first article code data is transmitted from said portable scanner to said central control unit.

29. The arrangement for tracking the movement of customers through a store in accordance with claim 26, wherein the collection of data is ended when said portable scanner is returned to said scanner dispenser.

30. The arrangement for tracking the movement of customers through a store in accordance with claim 26, further including a settlement account means for settling customers' accounts for articles purchased by said customers and said settlement account means transmits current status of said customers' accounts to said central control unit.

31. The arrangement for tracking the movement of customers through a store in accordance with claim 30, wherein the collection of data is ended upon settlement of said customers' accounts.

* * * * *

UNITED STATES PATENT AND TRADEMARK OFFICE
CERTIFICATE OF CORRECTION

PATENT NO. : 5,294,781
DATED : March 15, 1994
INVENTOR(S) : Mitsuo Takahashi et al.

It is certified that error appears in the above-indentified patent and that said Letters Patent is hereby corrected as shown below:

Column 5, line 68, "71" should be —7,—

Signed and Sealed this

Nineteenth Day of September, 1995

Attest:

BRUCE LEHMAN

Attesting Officer

Commissioner of Patents and Trademarks